(12) United States Patent
Hjelmgaard et al.

(10) Patent No.: US 11,274,444 B2
(45) Date of Patent: Mar. 15, 2022

(54) BINDER

(71) Applicant: Rockwool International A/S, Hedehusene (DK)

(72) Inventors: Thomas Hjelmgaard, Fredensborg (DK); Povl Nissen, Oelstykke (DK); Lars Naerum, Hellerup (DK); Erling Lennart Hansen, Virum (DK)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 1303 days.

(21) Appl. No.: 14/581,848

(22) Filed: Dec. 23, 2014

(65) Prior Publication Data

US 2016/0177057 A1 Jun. 23, 2016

(51) Int. Cl.
*E04C 2/00* (2006.01)
*E04C 2/16* (2006.01)
*C08K 3/30* (2006.01)
*C08K 3/32* (2006.01)

(52) U.S. Cl.
CPC .......... *E04C 2/16* (2013.01); *C08K 2003/309* (2013.01); *C08K 2003/329* (2013.01)

(58) Field of Classification Search
CPC .............................. E04C 2/16; C08K 2003/309
See application file for complete search history.

(56) References Cited

U.S. PATENT DOCUMENTS

| | | | | |
|---|---|---|---|---|
| 2,722,523 | A * | 11/1955 | Gilchrist | C09D 5/185 524/47 |
| 4,985,307 | A * | 1/1991 | Kobayashi | C09D 5/18 106/18.14 |
| 5,100,802 | A * | 3/1992 | Mickols | G01N 21/6408 436/172 |
| 5,244,474 | A * | 9/1993 | Lorcks | C10L 5/14 106/206.1 |
| 5,318,990 | A | 6/1994 | Strauss | |
| 5,612,394 | A * | 3/1997 | Pfeil | C08F 283/10 523/403 |
| 5,661,213 | A | 8/1997 | Arkens et al. | |
| 5,763,524 | A | 6/1998 | Arkens et al. | |
| 6,136,916 | A | 10/2000 | Arkens et al. | |
| 6,221,973 | B1 | 4/2001 | Arkens et al. | |
| 6,380,182 | B1 * | 4/2002 | McNeel | A01N 41/02 504/150 |
| 6,706,853 | B1 | 3/2004 | Stanssens et al. | |
| 6,730,730 | B1 | 5/2004 | Hansen et al. | |
| 6,849,683 | B2 | 2/2005 | Husemoen et al. | |
| 6,878,800 | B2 | 4/2005 | Husemoen et al. | |
| 6,881,008 | B1 * | 4/2005 | Maile | B09B 3/0025 106/132.2 |
| 7,008,545 | B2 | 3/2006 | Cronan | |
| 7,067,579 | B2 | 6/2006 | Taylor et al. | |
| 7,241,487 | B2 | 7/2007 | Taylor et al. | |
| 7,766,975 | B2 | 8/2010 | Clamen et al. | |
| 8,329,817 | B2 | 12/2012 | Espiard et al. | |
| 8,591,642 | B2 | 11/2013 | Hansen | |
| 8,864,893 | B2 | 10/2014 | Hawkins et al. | |
| 2002/0091185 | A1 | 7/2002 | Taylor et al. | |
| 2003/0153690 | A1 | 8/2003 | Husemoen et al. | |
| 2004/0024170 | A1 | 2/2004 | Husemoen et al. | |
| 2004/0141794 | A1 | 7/2004 | Slaboden | |
| 2006/0079629 | A1 | 4/2006 | Taylor et al. | |
| 2006/0111480 | A1 | 5/2006 | Hansen et al. | |
| 2006/0252855 | A1 | 11/2006 | Pisanova | |
| 2007/0006390 | A1 | 1/2007 | Clamen et al. | |
| 2007/0122359 | A1 * | 5/2007 | Wang | A61Q 11/00 424/52 |
| 2007/0173588 | A1 | 7/2007 | Espiard et al. | |
| 2009/0227706 | A1 | 9/2009 | Hansen et al. | |
| 2010/0012879 | A1 | 1/2010 | Nissen | |
| 2010/0015420 | A1 * | 1/2010 | Riebel | B32B 27/06 428/203 |
| 2010/0075146 | A1 | 3/2010 | Douce et al. | |
| 2010/0229759 | A1 * | 9/2010 | Nakano | B82Y 30/00 106/489 |
| 2010/0252771 | A1 | 10/2010 | Espiard et al. | |
| 2011/0086567 | A1 | 4/2011 | Hawkins et al. | |
| 2011/0101260 | A1 | 5/2011 | Pons Y Moll et al. | |
| 2011/0223364 | A1 * | 9/2011 | Hawkins | C03C 25/1095 428/34.5 |
| 2012/0037836 | A1 | 2/2012 | Hansen | |
| 2012/0319029 | A1 | 12/2012 | Jaffrennou et al. | |
| 2013/0101683 | A1 * | 4/2013 | Tu | B01D 65/02 424/665 |
| 2013/0140481 | A1 | 6/2013 | Naerum et al. | |
| 2014/0135430 | A1 * | 5/2014 | Naerum | C08J 5/24 524/58 |
| 2014/0342627 | A1 * | 11/2014 | Alavi | D06M 15/05 442/181 |
| 2015/0017858 | A1 | 1/2015 | Hawkins et al. | |

(Continued)

FOREIGN PATENT DOCUMENTS

| | | |
|---|---|---|
| EP | 583086 B1 | 11/1997 |
| EP | 990727 A1 | 4/2000 |
| EP | 1741726 A1 | 1/2007 |
| JP | H10167772 A | 6/1998 |
| SU | 1690545 A3 | 11/1991 |
| WO | 9936368 A1 | 7/1999 |
| WO | 0105725 A1 | 1/2001 |
| WO | 0196460 A2 | 12/2001 |
| WO | 0206178 A1 | 1/2002 |
| WO | 2004007615 A1 | 1/2004 |
| WO | 2006061249 A1 | 6/2006 |
| WO | 2006120523 A1 | 11/2006 |
| WO | 2008023032 A1 | 2/2008 |
| WO | 2008084173 A2 | 7/2008 |
| WO | 2010106181 A1 | 9/2010 |
| WO | 2011044490 A1 | 4/2011 |

(Continued)

*Primary Examiner* — Stefanie J Cohen

(74) *Attorney, Agent, or Firm* — Abel Schillinger, LLP

(57) ABSTRACT

Described is an aqueous binder composition for mineral fibers which comprises a component (i) in the form of one or more carbohydrates and a component (ii) in the form of one or more compounds selected from sulfamic acid, derivatives of sulfamic acid, salts thereof.

20 Claims, No Drawings

(56) References Cited

U.S. PATENT DOCUMENTS

2015/0033981 A1    2/2015   Hawkins et al.
2016/0143276 A1    5/2016   Lan

FOREIGN PATENT DOCUMENTS

| WO | 2012010694 A1 | 1/2012 |
| WO | 2013163245 A1 | 10/2013 |
| WO | 2013179323 A1 | 12/2013 |
| WO | WO-2013179323 A1 * | 12/2013 |

* cited by examiner

BINDER

FIELD OF THE INVENTION

The present invention relates to an aqueous binder for mineral fiber products, a method of producing a bonded mineral fiber product using said binder, and a mineral fiber product comprising mineral fibers in contact with the cured binder.

BACKGROUND OF THE INVENTION

Mineral fiber products generally comprise man-made vitreous fibers (MMVF) such as, e.g., glass fibers, ceramic fibers, basalt fibers, slag wool, mineral wool and stone wool (rock wool), which are bonded together by a cured thermoset polymeric binder material. For use as thermal or acoustical insulation products, bonded mineral fiber mats are generally produced by converting a melt made of suitable raw materials to fibers in conventional manner, for instance by a spinning cup process or by a cascade rotor process. The fibers are blown into a forming chamber and, while airborne and while still hot, are sprayed with a binder solution and randomly deposited as a mat or web onto a travelling conveyor. The fiber mat is then transferred to a curing oven where heated air is blown through the mat to cure the binder and rigidly bond the mineral fibers together.

In the past, the binder resins of choice have been phenol-formaldehyde resins which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders are reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties. WO 2008/023032 discloses urea-modified binders.

The disclosures of all of the documents mentioned herein are incorporated herein in their entireties.

Since some of the starting materials used in the production of these binders are rather expensive chemicals, there is an ongoing need to provide formaldehyde-free binders which are economically produced and at the same time show good bonding properties for producing a bonded mineral fiber product.

A further effect in connection with previously known aqueous binder compositions from mineral fibers is that at least the majority of the starting materials used for the productions of these binders stem from fossil fuels. There is an ongoing trend of consumers to prefer products that are at least partly produced from renewable materials and there is therefore a need to provide binders for mineral wool which are at least partly produced from renewable materials.

Further, there is an ongoing need to provide binders for mineral wool which enable the production of mineral wool products having good long term mechanical properties.

SUMMARY OF THE INVENTION

Accordingly, it would be advantageous have available an aqueous binder composition which is particularly suitable for bonding mineral fibers, is economically produced, shows good properties for bonding mineral fiber products and is including renewable materials as starting products for the preparation of the aqueous binder composition.

It would also be advantageous to have available a mineral fiber product bonded with such a binder composition.

In accordance with a first aspect of the present invention, there is provided an aqueous binder composition for mineral fibers comprising:
  a component (i) in the form of one or more carbohydrates;
  a component (ii) in the form of one or more compounds selected from sulfamic acid, derivatives of sulfamic acid or any salt thereof.

In accordance with a second aspect of the present invention, there is provided a method for producing a bonded mineral fiber product which comprises the steps of contacting the mineral fibers with such an aqueous binder composition and curing the binder composition.

In accordance with a third aspect of the present invention, there is provided a mineral fiber product comprising mineral fibers in contact with the cured binder composition set forth above.

The present inventors have surprisingly found that it is possible to prepare a binder composition for mineral fibers that is based on the combination of a carbohydrate component and a component selected from sulfamic acid, derivatives of sulfamic acid or any salt thereof. It is highly surprising that by the combination of these two components, binder compositions can be prepared which are suitable for bonding mineral fibers. Both these components have a comparatively low price and are easy to handle.

At the same time, the binders according to the present invention show excellent properties when used for binding mineral fibers. The mechanical strength is improved and has also an unexpected high level when subjected to ageing conditions.

An additional advantage of the binders according to the present invention is that they have a comparatively high curing speed at a low curing temperature.

The higher curing speed of the binders according to the present invention when compared to previously known binders allows the increase of the production capacity of a plant producing bonded mineral fiber products. At the same time, the low curing temperatures required for the binders according to the present invention save energy in the production process and limit the emission of volatile compounds in the production process.

As can be seen from the experimental results documented in the examples below, the aqueous binder compositions according to the present invention show excellent properties when used as a binder for mineral wool. As can further be seen in the experimental results documented in the examples below, the properties of the binders according to the present invention can be further improved by adding additional components.

Also, as can be seen from the experimental results documented in the examples below, the aqueous binder compositions according to aspects of the present invention have a considerably lower reaction loss than the reference binder A. The reaction loss achieved with binders according to aspects of the present invention is on the same level than the reaction loss for reference binders B, C and D (see examples below). However, unlike the binders according to the present invention, these reference binders B, C need a pre-reaction for the preparation of the binders.

DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description making apparent to those of skill in the art how the several forms of the present invention may be embodied in practice.

The aqueous binder composition according to the present invention comprises:
  a component (i) in form of one or more carbohydrates;
  a component (ii) in form of one or more compounds selected from sulfamic acid, derivatives of sulfamic acid or any salts thereof.

Preferably, the binders according to the present invention are formaldehyde-free.

For the purpose of the present application, the term "formaldehyde free" is defined to characterize a mineral wool product where the emission is below 8 µg/m$^2$/h of formaldehyde from the mineral wool product, preferably below 5 µg/m$^2$/h, most preferably below 3 µg/m$^2$/h. Preferably the test is carried out in accordance with ISO 16000 for testing aldehyde emissions.

Preferably the binder composition does not contain added formaldehyde.

Preferably, the binders according to the present invention have a pH of 5.1-10, preferably a pH of 6-9.

Component (i) of the Binder

Component (i) is in the form of one or more carbohydrates.

Starch may be used as a raw material for various carbohydrates such as glucose syrups and dextrose. Depending on the reaction conditions employed in the hydrolysis of starch, a variety of mixtures of dextrose and intermediates is obtained which may be characterized by their DE number. DE is an abbreviation for Dextrose Equivalent and is defined as the content of reducing sugars, determined by the method specified in International Standard ISO 5377-1981 (E). This method measures reducing end groups and attaches a DE of 100 to pure dextrose and a DE of 0 to pure starch.

In a preferred embodiment, the carbohydrate is selected from sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99. The term "dextrose" as used in this application is defined to encompass glucose and the hydrates thereof.

In a preferred embodiment, the carbohydrate has a DE value in the range of from 60 to less than 100, in particular from 60 to 99, more particular from 85 to 99.

In a further preferred embodiment, the carbohydrate is selected from hexoses, in particular allose, altrose, glucose, mannose, gulose, idose, galactose, talose, psicose, fructose, sorbose and/or tagatose; and/or pentoses, in particular arabinose, lyxose, ribose, xylose, ribulose and/or xylulose; and/or tetroses, in particular erythrose, threose, and/or erythrulose.

In a further preferred embodiment, the carbohydrate is selected from a hexose such as fructose, and/or a pentose such as xylose.

Since the carbohydrates of component (i) are comparatively inexpensive compounds and are produced from renewable resources, the inclusion of high amounts of component (i) in the binder according to the present invention allows the production of a binder for mineral wool which is advantageous under economic aspects and at the same time allows the production of an ecological non-toxic binder.

Component (ii) of the Binder

Component (ii) is in form of one or more compounds selected from sulfamic acid, derivatives of sulfamic acid or any salts thereof.

Sulfamic acid is a non-toxic compound having the formula

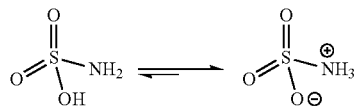

Sulfamic acid and many of its salts are storage stable non-volatile compounds and are available at a comparatively low price. In a preferred embodiment, component (ii) is selected from sulfamic acid and any salts thereof, such as ammonium sulfamate, calcium sulfamate, sodium sulfamate, potassium sulfamate, magnesium sulfamate, cobalt sulfamate, nickel sulfamate, N-cyclohexyl sulfamic acid and any salts thereof, such as sodium N-cyclohexyl sulfamate.

In a particularly preferred embodiment, component (ii) is or comprises ammonium sulfamate.

Besides providing binders which allow the production of mineral wool products having excellent mechanical properties, the inclusion of component (ii) also in general imparts improved fire resistance and anti-punking properties for aspects according to the invention.

Preferred Combinations of Component (i) and Component (ii) of the Binder

In a preferred embodiment, the aqueous binder composition according to the present invention comprises
  a component (i) in the form of a glucose syrup having a DE in the range of from 60 to less than 100, in particular of from 60 to 99, more particular of from 85 to 99;
  a component (ii) in the form of sulfamic acid and/or its salts, preferably ammonium sulfamate and/or N-cyclohexyl sulfamic acid and/or its salts.

Preferred Weight Ratios of Component (i) and Component (ii) in the Aqueous Binder Composition In a preferred embodiment, the proportion of components (i) and (ii) is within the range of 0.5-15 wt.-%, in particular 1-12 wt.-%, more particularly 2-10 wt.-% component (ii), based on the mass of component (i).

In a particularly preferred embodiment, the component (ii) is present in the form of N-cyclohexyl sulfamic acid and/or any salt(s) thereof and the proportion of component (i) and component (ii) in the form of N-cyclohexyl sulfamic acid and/or any salt(s) thereof is within the range of 0.5-20 wt.-%, in particular 1-15 wt.-%, more particularly 2-10 wt.-% component (ii), based on the mass of component (i).

Accordingly, the aqueous binder composition according to the present invention can be produced with weight proportions of the components (i) and (ii) so that the major part of the binder is the carbohydrate component, which is a renewable material. This gives the binder of the present invention the character of a product produced from biological materials.

Component (iii) of the Binder

In a preferred embodiment, the binder composition according to the present invention further comprises a component (iii) in form of one or more compounds selected from ammonia and/or amines such as piperazine, hexamethylenediamine, m-xylylenediamine, diethylenetriamine, triethylenetetramine, tetraethylenepentamine, monoethanolamine, diethanolamine, and/or triethanolamine.

In a particular preferred embodiment, component (iii) is ammonia. The ammonia may be added as an ammonium salt and/or as ammonia.

As can be seen in the experimental results reproduced in the examples below, the inclusion of component (iii) allows the further improvement of the binder according to the present invention when used as a binder for mineral wool products.

In a preferred embodiment, a binder including component (iii) comprises
- a component (i) in the form of a glucose syrup having a DE in the range of from 60 to less than 100, in particular from 60 to 99, more particularly from 85 to 99;
- a component (ii) in the form of sulfamic acid and/or one or more salts thereof, preferably ammonium sulfamate and/or N-cyclohexyl sulfamic acid and/or one or more salts thereof;
- a component (iii) in the form of ammonia.

In a preferred embodiment, the aqueous binder composition according to the present invention comprises components (i), (ii) and (iii), wherein the proportion of components (i), (ii) and (iii) is within the range of 0.5-15 wt.-%, in particular 1-12 wt.-%, more particularly 2-10 wt.-% component (ii), based on the mass of component (i), and in which the component (iii) is preferably present in the amount of 0.1 to 5 molar equivalents of component (iii) relative to the molar equivalents of component (ii).

In a particularly preferred embodiment, component (ii) is present in the form of N-cyclohexyl sulfamic acid and/or any salt thereof and the proportion of components (i), (ii) and (iii) is within the range of 0.5-20 wt.-%, in particular 1-15 wt.-%, more particular 2-10 wt.-% component (ii), based on the mass of component (i) and whereby component (iii) is preferably present in the amount of 0.1 to 5 molar equivalents of component (iii) relative to the molar equivalents of component (ii).

Component (iv) of the Binder

In a preferred embodiment, the binder composition according to the present invention further comprises a component (iv) in the form of a carboxylic acid, in particular selected from monomeric polycarboxylic acids, polymeric polycarboxylic acids, monomeric monocarboxylic acids, and/or polymeric monocarboxylic acid, such as polyacrylic acid.

In a particularly preferred embodiment, the binder composition according to the present invention further comprises a component (iv) in the form of a carboxylic acid, such as a monomeric polycarboxylic acid, preferably citric acid.

In a particular preferred embodiment, component (iv) is or comprises citric acid.

A preferred aqueous binder composition according to the present invention including component (iv) comprises:

- a component (i) in the form of a glucose syrup having a DE of from 60 to less than 100, in particular from 60 to 99, more particularly from 95 to 99;
- a component (ii) in form of sulfamic acid and/or one or more salts thereof, preferably ammonium sulfamate and/or N-cyclohexyl sulfamic acid and/or one or more salts thereof;
- a component (iii) in the form of ammonia;
- a component (iv) in the form of citric acid.

Preferably, the proportion of components (i), (ii), (iii) and (iv) is within the range of 0.5 to 15 wt.-%, in particular 1 to 12 wt.-%, more particularly 2 to 10 wt.-% component (ii) based on the mass of component (i), 3 to 30 wt.-%, in particular 5 to 25 wt.-%, more particularly 8 to 20 wt.-% (iv) based on the mass of component (i) and whereby component (iii) is preferably present in the amount of 0.1 to 5 molar equivalents of component (iii) relative to the combined molar equivalents of components (ii) and (iv).

The ammonia and citric acid may advantageously be added as ammonium salt of citric acid, such as triammonium citrate.

Component (v) of the Binder

In a preferred embodiment, the binder composition according to the present invention comprises a component (v) in form of one or more compounds selected from
compounds of the following formula, and any salts thereof:

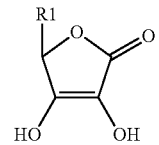

in which R1 corresponds to H, alkyl, monohydroxyalkyl, dihydroxyalkyl, polyhydroxyalkyl, alkylene, alkoxy, amine;
compounds of the following formula, and any salts thereof:

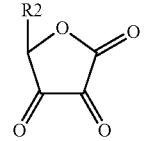

in which R2 corresponds to H, alkyl, monohydroxyalkyl, dihydroxyalkyl, polyhydroxyalkyl, alkylene, alkoxy, amine.

In a preferred embodiment, component (v) is selected from L-ascorbic acid, D-isoascorbic acid, 5,6-isopropylidene ascorbic acid, dehydroascorbic acid and/or any salts of these compounds, preferably calcium, sodium, potassium, magnesium or iron salts.

In a particular preferred embodiment, component (v) is or comprises L-ascorbic acid.

A preferred binder composition including component (v) comprises
- component (i) in the form of a glucose syrup having a DE of from 60 to less than 100, in particular from 60 to 99, more particularly from 85 to 99;
- component (ii) in the form of sulfamic acid and/or one or more salts thereof, preferably ammonium sulfamate and/or N-cyclohexyl sulfamic acid and/or one or more salts thereof;

component (iii) in the form of ammonia;
component (v) in the form of ascorbic acid.

Preferably, the proportion of components (i), (ii), (iii) and (v) is within the range of 50 to 99 weight-% component (i) based on the mass of components (i) and (v), 1 to 50 weight-%, preferably 1 to 30 weight-%, more preferably 1 to 20 weight-% component (v) based on the mass of components (i) and (v), 0.5-15 wt.-%, in particular 1-12 wt.-%, more particular 2-10 wt.-% component (ii), based on the mass of components (i) and (v), and whereby component (iii) is preferably present in the amount of 0.1 to 5 molar equivalents of component (iii) relative to the combined molar equivalents of component (ii) and (v).

Ascorbic acid, or vitamin C, is a non-toxic, naturally occurring organic compound with antioxidant properties, which can be produced from biomass. Ascorbic acid and its derivatives are therefore a product which is produced from renewable sources and can at the same time be obtained at a comparatively low price.

Component (vi) of the Binder

In a preferred embodiment, the binder composition according to the present invention further comprises a component (vi) in form of an additive selected from ammonium sulfate salts, ammonium phosphate salts, ammonium nitrate salts, ammonium carbonate salts, sulfuric acid, nitric acid, boric acid, hypophosphorous acid, phosphoric acid.

In a preferred embodiment, component (vi) is or comprises hypophosphorous acid. In a further preferred embodiment, component (vi) is or comprises sodium hypophosphite. In a further preferred embodiment, component (vi) is or comprises one or more ammonium sulfate salt, ammonium phosphate salts, ammonium nitrate salts and ammonium carbonate salts.

Ammonium sulfate salts may include $(NH_4)_2SO_4$, $(NH_4)HSO_4$ and $(NH_4)_2Fe(SO_4)_2 \cdot 6H_2O$.

Ammonium carbonate salts may include $(NH_4)_2CO_3$ and $NH_4HCO_3$.

Ammonium phosphate salts may include $H(NH_4)_2PO_4$, $NH_4H_2PO_4$ and ammonium polyphosphate.

In a preferred embodiment the aqueous binder composition according to the present invention including component (vi) comprises
component (i) in the form of a glucose syrup having a DE of from 60 to less than 100, in particular 60 to 99, more particularly 85 to 99;
component (ii) in the form of sulfamic acid and/or one or more salts thereof, preferably ammonium sulfamate and/or N-cyclohexyl sulfamic acid and/or one or more salts thereof;
component (iii) in the form of ammonia;
component (vi) in the form of hypophosphorous acid.

Preferably, the proportion of components (i), (ii), (iii) and (vi) is within the range of 0.5-15 wt.-%, in particular 1-12 wt.-%, more particularly 2-10 wt.-% component (ii), based on the mass of component (i), 0.5-10 wt.-%, in particular 1-8 wt.-%, more particularly 1-5 wt.-% component (vi) based on the mass of component (i) and whereby component (iii) is preferably present in the amount of 0.1 to 5 molar equivalents of component (iii) relative to the combined molar equivalents of components (ii) and (vi).

In a particularly preferred embodiment, component (ii) is present in the form of N-cyclohexyl sulfamic acid and/or one or more salts thereof and the proportion of components (i), (ii), (iii) and (vi) is within the range of 0.5-20 wt.-%, in particular 1-15 wt.-%, more particularly 2-10 wt.-% component (ii), based on the mass of component (i), 0.5-10 wt.-%, in particular 1-8 wt.-%, more particularly 1-5 wt.-% component (vi) based on the mass of component (i) and whereby component (iii) is preferably present in the amount of 0.1 to 5 molar equivalents of component (iii) relative to the combined molar equivalents of components (ii) and (vi).

In an alternative preferred embodiment, the aqueous composition according to the present invention comprises
component (i) in the form of a glucose syrup having a DE of from 60 to less than 100, in particular from 60 to 99, more particularly from 85 to 99;
component (ii) in the form of sulfamic acid and/or one or more salts thereof, preferably ammonium sulfamate and/or N-cyclohexyl sulfamic acid and/or one or more salts thereof;
component (iii) in the form of ammonia;
component (vi) in the form of ammonium sulfate.

Preferably, the proportion of components (i), (ii), (iii) and (vi) is in within the range of 0.5-15 wt.-%, in particular 1-12 wt.-%, more particularly 2-10 wt.-% component (ii), based on the mass of component (i), 0.5-10 wt.-%, in particular 1-8 wt.-%, more particularly 1-5 wt.-% component (vi), based on the mass of component (i) and whereby component (iii) is preferably present in the amount of 0.1 to 5 molar equivalents of component (iii) relative to the combined molar equivalents of components (ii) and (vi).

In a particularly preferred embodiment, component (ii) is present in the form of N-cyclohexyl sulfamic acid and/or one or more salts thereof and the proportion of components (i), (ii), (iii) and (vi) is in within the range of 0.5-20 wt.-%, in particular 1-15 wt.-%, more particularly 2-10 wt.-% component (ii), based on the mass of component (i), 0.5-10 wt.-%, in particular 1-8 wt.-%, more particularly 1-5 wt.-% component (vi), based on the mass of component (i), and whereby component (iii) is preferably present in the amount of 0.1 to 5 molar equivalents of component (iii) relative to the combined molar equivalents of component (ii) and (vi).

It has surprisingly been found that by adding component (vi) to the aqueous binder composition, the properties of the aqueous binder composition according to the present invention can be strongly improved.

In particular, the present inventors have found that by including component (vi) in the binder composition according to the present invention, the temperature of curing onset and curing endset can be strongly reduced.

Component (vii) of the Binder

In a preferred embodiment, the binder composition according to the present invention further comprises a component (vii) in the form of urea.

Preferably, an aqueous binder composition according to the present invention including component (vii) comprises
a component (i) in the form of a glucose syrup having a DE of from 60 to less than 100, in particular from 60 to 99, more particularly from 85 to 99,
a component (ii) in the form of sulfamic acid and/or one or more salts thereof, preferably ammonium sulfamate and/or N-cyclohexyl sulfamic acid and/or one or more salts thereof;
component (iii) in the form of ammonia;
a component (vii) in the form of urea.

Preferably, the proportion of components (i), (ii), (iii) and (vii) is within the range of 0.5-15 wt.-%, in particular 1-12 wt.-%, more particularly 2-10 wt.-% component (ii), based on the mass of component (i), 0.5-40 wt.-%, in particular 1-30 wt.-%, more particularly 5-25 wt.-% component (vii), based on the mass of component (i) and whereby component (iii) is preferably present in the amount of 0.1 to 5 molar equivalents of component (iii) relative to the molar equivalents of component (ii).

In a particularly preferred embodiment, component (ii) is or comprises N-cyclohexyl sulfamic acid and/or one or more salts thereof, wherein the proportion of components (i), (ii), (iii) and (vii) is within the range of 0.5-20 wt.-%, in particular 1-15 wt.-%, more particularly 2-10 wt.-% component (ii), based on the mass of component (i), 0.5-40 wt.-%, in particular 1-30 wt.-%, more particularly 5-25 wt.-% component (vii), based on the mass of component (i), and whereby component (iii) is preferably present in the amount of 0.1 to 5 molar equivalents of component (iii) relative to the molar equivalents of component (ii).

As can be seen in the experimental results set forth in the examples below, the inclusion of urea decreases the curing onset and endset temperature while the reaction losses are only slightly increased. At the same time, the mechanical strength of a mineral wool product bonded by the binder according to the present invention comprising urea is retained at the same level as those of analogous binders without urea.

The inclusion of urea in the binder according to aspects of the present invention improves the fire resistance and anti-punking properties.

Component (viii) of the Binder

In a preferred embodiment, the binder composition of the present invention further comprises a component (viii) in form of one or more fluorescent dyes which are non-fluorescent after curing of the binder.

Preferably, component (viii) is selected from
one or more xanthenes, such as rhodamine 101 inner salt, sulforhodamine B, rhodamine B, rhodamine 6G, 2',7'-dichlorofluorescein, fluorescein sodium salt, rhodamine 110 chloride, eosin B, erythrosin B, eosin Y disodium salt;
one or more pyrenes, such as pyranine;
one or more diarylmethanes, such as auramine 0;
one or more acridines, such as acridine yellow G, acridine orange base;
one or more triazenes, such as thiazole yellow G.

In a preferred embodiment, the component (viii) is in the form of one or more xanthenes, in particular fluorescein sodium salt, in a concentration of 0.001 to 1 wt.-%, in particular 0.01 to 0.5, more particular 0.05 to 0.4 wt.-%, based on the binder solids.

The present inventors have found that by providing an aqueous curable binder composition comprising a fluorescent dye, the curing of the binder on the mineral wool product can be detected because the fluorescence of the binder material is influenced by the curing. Without wanting to be bound by any specific theory, it is assumed that the mechanism for the cease of fluorescence might, for example, be due to a decomposition of the dye or an incorporation of the dye into the curing binder.

For the purpose of the present invention, the term "cured or partly cured binder" refers to a binder which has at least been cured to a certain degree, e.g. by thermally treating in a curing apparatus, but has not necessarily been treated to achieve full curing in all regions of the product. Accordingly, the term "cured or partly cured binder" for the purpose of the present invention includes binders containing cured and uncured regions.

The aqueous binder composition according to the present invention including component (viii) allows for a surprisingly easy detection of the distribution of uncured binder by merely observing the presence or absence and/or the pattern of fluorescence on the surface of the mineral wool product and/or detecting a color change on the surface of the mineral wool product, e.g. by visual inspection. The distribution of uncured binder in or on the product can be detected within a wide time range after the production of the mineral wool product and it is possible to detect the distribution of uncured binder on a mineral wool product freshly made and just leaving the curing oven after cooling. Irregularities in the curing or anomalies of the binder distribution like the agglomeration of large amounts of binder in a single part of the mineral fiber product (called "chewing gums") can therefore immediately be detected and the production process can therefore be re-adjusted quickly, thereby minimizing the wastage of inadequate products. As a further advantage, the aqueous binder compositions according to the present invention including component (viii) allow such a detection in a non-destructive way.

Component (ix) of the Binder

In a preferred embodiment, the binder composition of the present invention further comprises a component (ix) in the form of one or more reactive or non-reactive silicones.

Preferably, the component (ix) is selected from silicones constituted of a main chain composed of organosiloxane residues, especially diphenylsiloxane residues, alkylsiloxane residues, preferably dimethylsiloxane residues, bearing at least one hydroxyl, carboxyl or anhydride, amine, epoxy or vinyl functional group capable of reacting with at least one of the constituents of the binder composition and is preferably present in an amount of 0.1-15 weight-%, preferably 0.1-10 weight-%, more preferably 0.3-8 weight-%, based on the binder solids.

Further Preferred Embodiments of the Binder Composition

In a further preferred embodiment of the binder composition, the binder composition consists essentially of
a component (i) in the form of one or more carbohydrates;
a component (ii) in the form of one or more compounds selected from sulfamic acid, derivatives of sulfamic acid or any salts thereof;
optionally a component (iii) in the form of one or more compounds selected from ammonia and/or amines, such as piperazine, hexamethylenediamine, m-xylylenediamine, diethylenetriamine, triethylenetetramine, tetraethylenepentamine, monoethanolamine, diethanolamine, triethanolamine;
optionally a component (iv) in the form of a carboxylic acid, in particular in the form of a monomeric polycarboxylic acid and/or a polymeric monocarboxylic acid and/or a polymeric polycarboxylic acid and/or a monomeric monocarboxylic acid;
optionally a component (v) in the form of one or more compounds selected from
compounds of the following formula, and any salts thereof:

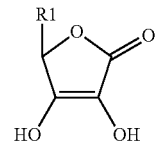

in which R1 corresponds to H, alkyl, monohydroxyalkyl, dihydroxyalkyl, polyhydroxyalkyl, alkylene, alkoxy, amine;
compounds of the following formula, and any salts thereof:

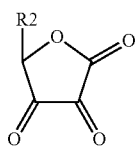

in which R2 corresponds to H, alkyl, monohydroxyalkyl, dihydroxyalkyl, polyhydroxyalkyl, alkylene, alkoxy, amine;

optionally a component (vi) in the form of an additive selected from a mineral acid salt, such as ammonium sulfate salts, ammonium phosphate salts, ammonium nitrate salts, ammonium carbonate salts, sodium hypophosphite and/or a mineral acid, such as sulfuric acid, nitric acid, boric acid, hypophosphorous acid and phosphoric acid;

optionally a component (vii) in the form of urea;

optionally a component (viii) in the form of one or more fluorescent dyes being non-fluorescent after curing of the binder;

optionally a component (ix) in the form of one or more reactive or non-reactive silicones;

optionally a component in the form of a silane;

optionally an emulsified hydrocarbon oil;

optionally a detergent;

water.

In a further preferred embodiment the binder composition consists essentially of a component (i) in the form of a glucose syrup having a DE of from 60 to less than 100, in particular of from 60 to 99, more particularly from 85 to 99;

a component (ii) in the form of sulfamic acid and/or one or more salts thereof, preferably ammonium sulfamate and/or N-cyclohexyl sulfamic acid and/or its salts;

optionally a component (iii) in the form of ammonia;

optionally a component (iv) in the form of citric acid;

optionally a component (v) in the form of ascorbic acid;

optionally a component (vi) in the form of an ammonium sulfate salt and/or hypophosphorous acid;

optionally a component (vii) in the form of urea;

optionally a component (viii) in the form of fluorescein sodium salt;

optionally a component (ix) selected from silicons constituted of a main chain composed of organosiloxane residues, especially diphenylsiloxane residues, alkylsiloxane residues, preferably dimethylsiloxane residues, bearing at least one hydroxyl, carboxyl or anhydride, amine, epoxy or vinyl functional group capable of reacting with at least one of the constituents of the binder composition;

optionally a component in the form of a silane;

optionally an emulsified hydrocarbon oil;

optionally a detergent;

water.

In a particular preferred embodiment, the aqueous binder composition according to the present invention does not contain a polycarboxylic acid.

Mineral Fiber Product

The present invention is also directed to a method of producing a bonded mineral fiber product which comprises the steps of contacting mineral fibers with a binder composition described above and curing the binder composition.

The present invention is also directed to a mineral fiber product, comprising mineral fibers in contact with the cured binder composition described above.

The mineral fibers employed may be any of man-made vitreous fibers (MMVF), glass fibers, ceramic fibers, basalt fibers, slag fibers, rock fibers, stone fibers and others. These fibers may be present as a wool product, e.g. like a rock wool product.

Suitable fiber formation methods and subsequent production steps for manufacturing the mineral fiber product are those conventional in the art. Generally, the binder is sprayed immediately after fibrillation of the mineral melt onto the air-borne mineral fibers.

The spray-coated mineral fiber web is generally cured in a curing oven by means of a hot air stream. The hot air stream may be introduced into the mineral fiber web from below, or above or from alternating directions in distinctive zones in the length direction of the curing oven.

Typically, the curing oven is operated at a temperature of from about 150° C. to about 350° C. Preferably, the curing temperature ranges from about 200 to about 300° C. Generally, the curing oven residence time is from 30 seconds to 20 minutes, depending on, for instance, the product density.

If desired, the mineral wool web may be subjected to a shaping process before curing. The bonded mineral fiber product emerging from the curing oven may be cut to a desired format e.g., in the form of a batt. Thus, the mineral fiber products produced, for instance, have the form of woven and nonwoven fabrics, mats, batts, slabs, sheets, plates, strips, rolls, granulates and other shaped articles which find use, for example, as thermal or acoustical insulation materials, vibration damping, construction materials, facade insulation, reinforcing materials for roofing or flooring applications, as filter stock, as horticultural growing media and in other applications.

In accordance with the present invention, it is also possible to produce composite materials by combining the bonded mineral fiber product with suitable composite layers or laminate layers such as, e.g., metal, plaster boards, glass surfacing mats and other woven or non-woven materials.

The mineral fiber products according to the present invention generally have a density within the range of from 6 to 250 kg/m$^3$, preferably 20 to 200 kg/m$^3$. The mineral fiber products generally have a loss on ignition (LOT) within the range of from 0.1 to 18.0%, preferably from 0.2 to 8.0% by weight.

Although the aqueous binder composition according to the present invention is particularly useful for bonding mineral fibers, it may equally be employed in other applications typical for binders and sizing agents, e.g. as a binder for foundry sand, chipboard, glass fiber tissue, cellulosic fibers, non-woven paper products, composites, moulded articles, coatings etc.

To sum up, the present invention provides the following items:

1. An aqueous binder composition for mineral fibers comprising
    a component (i) in the form of one or more carbohydrates;
    a component (ii) in the form of one or more compounds selected from sulfamic acid, derivatives of sulfamic acid or any salts thereof.

2. An aqueous binder composition according to item 1, wherein component (i) is present in the form of one or more carbohydrates having a DE value of from 60 to less than 100, in particular from 60 to 99, more particularly from 85 to 99.

3. An aqueous binder composition according to any one of the preceding items, wherein component (i) is present as a glucose syrup having a DE of from 60 to less than 100, in particular of from 60 to 99, more particularly from 85 to 99.
4. An aqueous binder composition according to any one of items 1 or 2, wherein component (i) is a hexose, such as fructose, and/or a pentose, such as xylose.
5. An aqueous binder according to any one of the preceding items, wherein component (ii) is selected from sulfamic acid and any salt thereof, such as ammonium sulfamate, calcium sulfamate, sodium sulfamate, potassium sulfamate, magnesium sulfamate, cobalt sulfamate, nickel sulfamate, N-cyclohexyl sulfamic acid and any salt thereof, such as sodium N-cyclohexyl sulfamate.
6. An aqueous binder composition according to any one of the preceding items comprising
   a component (i) in the form of a glucose syrup having a DE of from 60 to less than 100, in particular of from 60 to 99, more particularly from 85 to 99;
   a component (ii) in the form of sulfamic acid and/or one or more salts thereof, preferably ammonium sulfamate, and/or N-cyclohexyl sulfamic acid and/or one or more salts thereof.
7. An aqueous binder composition according to any one of the preceding items, wherein the proportion of components (i) and (ii) is within the range of 0.5-15 wt.-%, in particular 1-12 wt.-%, more particularly 2-10 wt.-% component (ii), based on the mass of component (i).
8. An aqueous binder composition according to any one of the preceding items, which further comprises a component (iii) in the form of one or more compounds selected from ammonia and/or amines, such as piperazine, hexamethylenediamine, m-xylylenediamine, diethylenetriamine, triethylenetetramine, tetraethylenepentamine, monoethanolamine, diethanolamine, and/or triethanolamine.
9. An aqueous binder composition according to item 8, comprising
   a component (i) in the form of a glucose syrup having a DE of from 60 to less than 100, in particular from 60 to 99, more particularly from 85 to 99;
   a component (ii) in the form of sulfamic acid and/or one or more salts thereof, preferably ammonium sulfamate, and/or N-cyclohexyl sulfamic acid and/or one more salts thereof;
   a component (iii) in the form of ammonia.
10. An aqueous binder composition according to item 8 or 9, wherein the proportion of components (i), (ii) and (iii) is within the range of 0.5-15 wt.-%, in particular 1-12 wt.-%, more particularly 2-10 wt.-% component (ii), based on the mass of component (i), and in which component (iii) is preferably present in the amount of 0.1 to 5 molar equivalents of component (iii) relative to the molar equivalents of component (ii).
11. An aqueous binder composition according to any one of the preceding items, wherein the aqueous binder composition further comprises a component (iv) in form of a carboxylic acid, such as a monomeric polycarboxylic acid, preferably citric acid.
12. An aqueous binder composition according to any one of the preceding claims, wherein the binder composition further comprises a component (v) in the form of one or more compounds selected from
   compounds of the following formula, and any salts thereof:

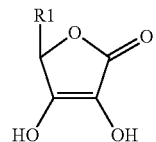

in which R1 corresponds to H, alkyl, monohydroxyalkyl, dihydroxyalkyl, polyhydroxyalkyl, alkylene, alkoxy, amine;
   compounds of the following formula, and any salts thereof:

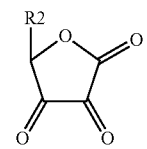

in which R2 corresponds to H, alkyl, monohydroxyalkyl, dihydroxyalkyl, polyhydroxyalkyl, alkylene, alkoxy, amine.
13. An aqueous binder composition according to item 12, comprising
   component (i) in the form of a glucose syrup having a DE of from 60 to less than 100, in particular from 60 to 99, more particularly from 85 to 99;
   component (ii) in the form of sulfamic acid and/or one or more salts thereof, preferably ammonium sulfamate, and/or N-cyclohexyl sulfamic acid and/or one or more salts thereof;
   component (iii) in the form of ammonia;
   component (v) in the form of ascorbic acid.
14. An aqueous binder composition according to item 12 or 13, wherein the proportion of components (i), (ii), (iii) and (v) is within the range of from 50 to 99 weight-% component (i) based on the mass of components (i) and (v), from 1 to 50 weight-% component (v) based on the mass of components (i) and (v), 0.5-15 wt.-%, in particular 1-12 wt.-%, more particularly 2-10 wt.-% component (ii), based on the mass of components (i) and (v), and wherein component (iii) is preferably present in the amount of 0.1 to 5 molar equivalents of component (iii) relative to the combined molar equivalents of component (ii) and (v).
15. An aqueous binder composition according to any one of the preceding items, wherein the binder composition further comprises a component (vi) in the form of an additive selected from one or more of ammonium sulfate salts, ammonium phosphate salts, ammonium nitrate salts, ammonium carbonate salts, sulfuric acid, nitric acid, boric acid, hypophosphorous acid, sodium hypophosphite, phosphoric acid.
16. An aqueous binder composition according to item 15, comprising
   component (i) in the form of a glucose syrup having a DE of from 60 to less than 100, in particular of from 60 to 99, more particularly of from 85 to 99;
   component (ii) in the form of sulfamic acid and/or one or more salts thereof, preferably ammonium sulfamate, and/or N-cyclohexyl sulfamic acid and/or one or more salts thereof;
   component (iii) in the form of ammonia;
   component (vi) in the form of hypophosphorous acid.

17. An aqueous binder composition according to item 15 or 16, wherein the proportion of components (i), (ii), (iii) and (vi) is in within the range of 0.5-15 wt.-%, in particular 1-12 wt.-%, more particularly 2-10 wt.-% component (ii), based on the mass of component (i), 0.5-10 wt.-%, in particular 1-8 wt.-%, more particularly 1-5 wt.-% component (vi), based on the mass of component (i), and wherein component (iii) is preferably present in the amount of 0.1 to 5 molar equivalents of component (iii) relative to the combined molar equivalents of component (ii) and (vi).

18. An aqueous composition according to item 15, comprising
component (i) in the form of a glucose syrup having a DE of from 60 to less than 100, in particular from 60 to 99, more particularly from 85 to 99;
component (ii) in the form of sulfamic acid and/or one or more salts thereof, preferably ammonium sulfamate, and/or N-cyclohexyl sulfamic acid and/or one or more salts thereof;
component (iii) in the form of ammonia;
component (vi) in the form of ammonium sulfate.

19. An aqueous binder composition according to item 15 or 18, wherein the proportion of components (i), (ii), (iii) and (vi) is in within the range of 0.5-15 wt.-%, in particular 1-12 wt.-%, more particularly 2-10 wt.-% component (ii), based on the mass of component (i), 0.5-10 wt.-%, in particular 1-8 wt.-%, more particularly 1-5 wt.-% component (vi), based on the mass of component (i), and wherein component (iii) is preferably present in the amount of 0.1 to 5 molar equivalents of component (iii) relative to the combined molar equivalents of component (ii) and (vi).

20. An aqueous binder composition according to any one of the preceding items, wherein the aqueous binder composition further comprises a component (vii) in the form of urea.

21. An aqueous binder composition according to item 20, comprising
a component (i) in the form of a glucose syrup having a DE of from 60 to less than 100, in particular from 60 to 99, more particularly from 85 to 99;
a component (ii) in the form of sulfamic acid and/or one or more salts thereof, preferably ammonium sulfamate, and/or N-cyclohexyl sulfamic acid and/or one or more salts thereof;
component (iii) in the form of ammonia;
a component (vii) in the form of urea.

22. An aqueous binder composition according to item 20 or 21, wherein the proportion of components (i), (ii) and (vii) is within the range of 0.5-15 wt.-%, in particular 1-12 wt.-%, more particularly 2-10 wt.-% component (ii), based on the mass of component (i), 0.5-40 wt.-%, in particular 1-30 wt.-%, more particularly 5-25 wt.-% component (vii), based on the mass of component (i), and wherein component (iii) is preferably present in the amount of 0.1 to 5 molar equivalents of component (iii) relative to the molar equivalents of component (ii).

23. An aqueous binder composition according to any one of the preceding claims, wherein the aqueous binder composition further comprises a component (viii) in the form of one or more fluorescent dyes which are non-fluorescent after curing of the binder.

24. An aqueous binder composition according to item 23, wherein the component (viii) is selected from one or more xanthenes, such as rhodamine 101 inner salt, sulforhodamine B, rhodamine B, rhodamine 6G, 2',7'-dichlorofluorescein, fluorescein sodium salt, rhodamine 110 chloride, eosin B, erythrosin B, eosin Y disodium salt;
one or more pyrenes, such as pyranine;
one or more diarylmethanes, such as auramine 0;
one or more acridines, such as acridine yellow G, acridine orange base;
one or more triazenes, such as thiazole yellow G.

25. An aqueous binder composition according to items 23 or 24, wherein the binder composition comprises one or more xanthenes, in particular fluorescein sodium salt, in a concentration of from 0.001 to 1 wt.-%, in particular from 0.01 to 0.5, more particularly from 0.05 to 0.4 wt.-%, based on the binder solids.

26. An aqueous binder composition according to any one of items 1 to 7, consisting essentially of
a component (i) in the form of one or more carbohydrates;
a component (ii) in the form of one or more compounds selected from sulfamic acid, derivatives of sulfamic acid or any salt thereof;
optionally a component (iii) in the form of one or more compounds selected from ammonia, and/or amines;
optionally a component (iv) in the form of a carboxylic acid;
optionally a component (v) in the form of one or more compounds selected from
compounds of the following formula, and any salts thereof:

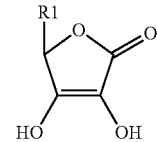

in which R1 corresponds to H, alkyl, monohydroxyalkyl, dihydroxyalkyl, polyhydroxyalkyl, alkylene, alkoxy, amine;
compounds of the following formula, and any salts thereof:

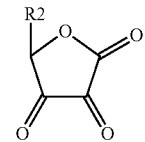

in which R2 corresponds to H, alkyl, monohydroxyalkyl, dihydroxyalkyl, polyhydroxyalkyl, alkylene, alkoxy, amine;
optionally a component (vi) in the form of one or more additives selected from a mineral acid salt, such as ammonium sulfate salts, ammonium phosphate salts, ammonium nitrate salts, ammonium carbonate salts, sodium hypophosphite and/or a mineral acid, such as sulfuric acid, nitric acid, boric acid, hypophosphorous acid, phosphoric acid;
optionally a component (vii) in the form of urea;
optionally a component (viii) in the form of one or more fluorescent dyes which are non-fluorescent after curing of the binder;

optionally a component (ix) in the form of one or more reactive or non-reactive silicones;
optionally a component in the form of a silane;
optionally an emulsified hydrocarbon oil;
optionally a detergent;
water.

27. An aqueous binder composition according to items 1 to 7 or 26, consisting essentially of
a component (i) in the form of a glucose syrup having a DE of from 60 to less than 100, in particular of from 60 to 99, more particularly from 85 to 99;
a component (ii) in the form of sulfamic acid and/or one or more salts thereof, preferably ammonium sulfamate, and/or N-cyclohexyl sulfamic acid and/or one or more salts thereof;
optionally a component (iii) in the form of ammonia;
optionally a component (iv) in the form of citric acid;
optionally a component (v) in the form of ascorbic acid;
optionally a component (vi) in the form of an ammonium sulfate salt and/or hypophosphorous acid;
optionally a component (vii) in the form of urea;
optionally a component (viii) in the form of fluorescein sodium salt;
optionally a component (ix) selected from silicones constituted of a main chain composed of organosiloxane residues, especially diphenylsiloxane residues, alkylsiloxane residues, preferably dimethylsiloxane residues, bearing at least one hydroxyl, carboxyl or anhydride, amine, epoxy or vinyl functional group capable of reacting with at least one of the constituents of the binder composition;
optionally a component in the form of a silane;
optionally an emulsified hydrocarbon oil;
optionally a detergent;
water.

28. A method of producing a bonded mineral fiber product which comprises contacting the mineral fibers with a binder composition according to any one of items 1 to 27, and curing the binder composition.

29. A mineral fiber product, comprising mineral fibers in contact with the cured binder composition according to any one of items 1 to 27.

The following examples are intended to further illustrate the invention without limiting its scope.

EXAMPLES

In the following examples, several binders which fall under the definition of the present invention were prepared and compared to binders according to the prior art.

The following properties were determined for the binders according to the present invention and the binders according to the prior art, respectively:

Binder Component Solids Content

The content of each of the components in a given binder solution before curing is based on the anhydrous mass of the components.

Except for 28% aq. ammonia (Sigma Aldrich), 75% aq. glucose syrup with a DE-value of 95 to less than 100 (C*sweet D 02767 ex Cargill), and 50% aq. hypophosporous acid (Sigma Aldrich), all other components were supplied in high purity by Sigma-Aldrich and were assumed anhydrous for simplicity.

Binder Solids

The content of binder after curing is termed "binder solids".

Disc-shaped stone wool samples (diameter: 5 cm; height 1 cm) were cut out of stone wool and heat-treated at 580° C. for at least 30 minutes to remove all organics. The binder solids of a given binder solution was measured by distributing two samples of the binder solution (each approx. 2 g) onto two of the heat treated stone wool discs which were weighed directly before and after application of the binder solution. The binder loaded stone wool discs were then heated at 200° C. for 1 hour. After cooling and storing at room temperature for 10 minutes, the samples were weighed and the binder solids content was calculated as an average of the two results. A binder with a desired binder solids content could then be produced by diluting with the required amount of water or water and 10% aq. silane (Momentive VS-142).

Reaction Loss

The reaction loss is defined as the difference between the binder component solids content and the binder solids.

Curing Characteristics—DMA (Dynamic Mechanical Analysis) Measurements

A 15% binder solids binder solution was obtained as described above. Cut and weighed glass Whatman™ glass microfiber filters (GF/B, 150 mm ∅, cat. no. 1821 150) (2.5×1 cm) were submerged into the binder solution for 10 seconds. The resulting binder-soaked filter was then dried in a "sandwich" consisting of (1) a 0.60 kg 8×8×1 cm metal plate, (2) four layers of standard filter papers, (3) the binder soaked glass microfiber filter, (4) four layers of standard filter papers, and (5) a 0.60 kg 8×8×1 cm metal plate for approximately 2×2 minutes by applying a weight of 3.21 kg on top of the "sandwich". In a typical experiment, the cut Whatman™ glass microfiber filter would weigh 0.035 g before application of the binder and 0.125 g after application and drying which corresponds to a binder solution loading of 72%. All DMA measurements were performed with 72±1% binder solution loadings.

The DMA measurements were acquired on a Mettler Toledo DMA 1 calibrated against a certified thermometer at ambient temperature and the melting points of certified indium and tin. The apparatus was operated in single cantilever bending mode; titanium clamps; clamp distance 1.0 cm; temperature segment type; temperature range 40-280° C.; heating rate 3° C./min; displacement 20 μm; frequency 1 Hz; single frequency oscillation mode. Curing onset and endset were evaluated using STARe software Version 12.00.

Mechanical Strength Studies

The mechanical strength of the binders was tested in a tablet test. For each binder, four tablets were manufactured from a mixture of the binder and stone wool shots from the stone wool spinning production. The shots are particles which have the same melt composition as the stone wool fibers, and the shots are normally considered a waste product from the spinning process. The shots used for the tablet composition have a size of 0.25-0.50 mm.

A 15% binder solids binder solution containing 0.5-1% silane (Momentive VS-142) of binder solids was obtained as described above. Four samples of the binder solution (each 4.0 g) were then mixed well with four samples of shots (each 20.0 g). The resulting four mixtures were then transferred into four round aluminum foil containers (bottom ∅=4.5 cm, top ∅=7.5 cm, height=1.5 cm). One by one, the mixtures were then pressed hard with a suitably sized flat bottom glass beaker to generate an even tablet surface. The resulting tablets were then cured at 250° C. for 1 h. After cooling to room temperature, the tablets were carefully taken out of the containers. Two of the four tablets were then submerged into a water bath at 80° C. for 3 h to simulate aging. After drying for 1-2 days, the tablets were manually broken in two halves whereby the capacity of the given binder to bind shots together could be evaluated. The binders were given the notes strong (*), medium (), acceptable (*/**) or weak (*).

Reference Binders from the Prior Art Prepared as Comparative Examples

Binder Example, Reference Binder A

A mixture of anhydrous citric acid (1.7 g, 8.84 mmol) and dextrose monohydrate (9.55 g; thus efficiently 8.68 g, 48.2 mmol dextrose) in water (26.3 g) was stirred at room temperature until a clear solution was obtained. 28% aq. ammonia (1.30 g; thus efficiently 0.36 g, 21.4 mmol ammonia) was then added dropwise (pH=5.18. The binder solids was then measured (16.8%).

For DMA studies (15% binder solids solution), the binder mixture was diluted with water (0.121 g/g binder mixture). For mechanical strength studies (15% binder solids solution, 0.5% silane of binder solids), the binder mixture was diluted with water (0.113 g/g binder mixture) and 10% aq. silane (0.008 g/g binder mixture). The final binder mixture for mechanical strength studies had pH=5.0.

Binder Example, Reference Binder B

This binder is a phenol-formaldehyde resin modified with urea, a PUF-resol.

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) ad 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

$$AT = (\text{Used titration volume (mL)})/(\text{Sample volume (mL)})$$

Using the urea-modified phenol-formaldehyde resin obtained, a binder is made by addition of 25% aq. ammonia (90 mL) and ammonium sulfate (13.2 g) followed by water (1.30 kg).

The binder solids was then measured as described above and the mixture was diluted with the required amount of water for DMA measurements (15% binder solids solution) or water and silane (15% binder solids solution, 0.5% silane of binder solids, Momentive VS-142) for mechanical strength measurements.

Binder Example, Reference Binder C

This binder is based on alkanolamine-polycarboxylic acid anhydride reaction products.

Diethanolamine (DEA, 231.4 g) is placed in a 5-litre glass reactor provided with a stirrer and a heating/cooling jacket. The temperature of the diethanolamine is raised to 60° C. where after tetrahydrophthalic anhydride (THPA, 128.9 g) is added. After raising the temperature and keeping it at 130° C., a second portion of tetrahydrophthalic anhydride (64.5 g) is added followed by trimellitic anhydride (TMA, 128.9 g). After reacting at 130° C. for 1 hour, the mixture is cooled to 95° C. Water (190.8 g) is added and stirring is continued for 1 hour. After cooling to ambient temperature, the mixture is poured into water (3.40 kg) and 50% aq. hypophosphorous acid (9.6 g) and 25% aq. ammonia (107.9 g) are added under stirring. Glucose syrup (1.11 kg) is heated to 60° C. and then added under stirring followed by 50% aq. silane (Momentive VS-142) (5.0 g).

The binder solids content was then measured as described above and the mixture was diluted with the required amount of water for DMA and mechanical strength measurements (15% binder solids solutions).

Binder Example, Reference Binder D

This binder is based on alkanolamine-polycarboxylic acid anhydride reaction products.

Diethanolamine (DEA, 120.5 g) is placed in a 5-litre glass reactor provided with a stirrer and a heating/cooling jacket. The temperature of the diethanolamine is raised to 60° C. where after tetrahydrophthalic anhydride (THPA, 67.1 g) is added. After raising the temperature and keeping it at 130° C., a second portion of tetrahydrophthalic anhydride (33.6 g) is added followed by trimellitic anhydride (TMA, 67.1 g). After reacting at 130° C. for 1 hour, the mixture is cooled to 95° C. Water (241.7 g) is added and stirring is continued for 1 hour. Urea (216.1 g) is then added and stirring is continued until all solids are dissolved. After cooling to ambient temperature, the mixture is poured into water (3.32 kg) and 50% aq. hypophosphorous acid (5.0 g) and 25% aq. ammonia (56.3 g) are added under stirring.

Glucose syrup (1.24 kg) is heated to 60° C. and then added under stirring followed by 50% aq. silane (Momentive VS-142) (5.0 g).

The binder solids content was then measured as described above and the mixture was diluted with the required amount of water for DMA and mechanical strength measurements (15% binder solids solutions).

Binder Example, Reference Binder E

A mixture of L-ascorbic acid (1.50 g, 8.52 mmol) and 75.1% aq. glucose syrup (18.0 g; thus efficiently 13.5 g glucose syrup) in water (30.5 g) was stirred at room temperature until a clear solution was obtained. 50% aq. hypophosphorous acid (1.50 g; thus efficiently 0.75 g, 11.4 mmol hypophosphorous acid) was then added (pH 1.2). 28% aq. ammonia (1.51 g; thus efficiently 0.42 g, 24.8 mmol ammonia) was then added dropwise until pH =6.3. The binder solids was then measured (20.2%).

For DMA studies (15% binder solids solution), the binder mixture was diluted with water (0.347 g/g binder mixture). For mechanical strength studies (15% binder solids solution, 0.5% silane of binder solids, the binder mixture was diluted with water (0.337 g/g binder mixture) and 10% aq. silane (0.010 g/g binder mixture, Momentive VS-142). The final binder mixture for mechanical strength studies had pH=6.4.

Binder Example, Reference Binder F

A mixture of L-ascorbic acid (1.50 g, 8.52 mmol) and 75.1% aq. glucose syrup (18.0 g; thus efficiently 13.5 g glucose syrup) in water (30.5 g) was stirred at room temperature until a clear solution was obtained. 50% aq. hypophosphorous acid (0.60 g; thus efficiently 0.30 g, 4.55 mmol hypophosphorous acid) was then added (pH 1.3). 28% aq. ammonia (0.99 g; thus efficiently 0.28 g, 16.3 mmol ammonia) was then added dropwise until pH=6.7. The binder solids was then measured (20.1%).

For DMA studies (15% binder solids solution), the binder mixture was diluted with water (0.341 g/g binder mixture). For mechanical strength studies (15% binder solids solution, 0.5% silane of binder solids), the binder mixture was diluted with water (0.331 g/g binder mixture) and 10% aq. silane (0.010 g/g binder mixture, Momentive VS-142). The final binder mixture for mechanical strength studies had pH=6.4.

Binder Example, Reference Binder G

A mixture of L-ascorbic acid (3.00 g, 17.0 mmol) and 75.1% aq. glucose syrup (16.0 g; thus efficiently 12.0 g glucose syrup) in water (31.0 g) was stirred at room temperature until a clear solution was obtained. 50% aq. hypophosphorous acid (0.60 g; thus efficiently 0.30 g, 4.55 mmol hypophosphorous acid) was then added (pH 1.2). 28% aq. ammonia (1.94 g; thus efficiently 0.54 g, 31.9 mmol ammonia) was then added dropwise until pH=6.5. The binder solids was then measured (19.6%).

For DMA studies (15% binder solids solution), the binder mixture was diluted with water (0.306 g/g binder mixture). For mechanical strength studies (15% binder solids solution, 0.5% silane of binder solids), the binder mixture was diluted with water (0.296 g/g binder mixture) and 10% aq. silane (0.010 g/g binder mixture, Momentive VS-142). The final binder mixture for mechanical strength studies had pH=6.6.

Binder Compositions According to the Present Invention

In the following, the entry numbers of the binder example correspond to the entry numbers used in Table 1.

Binder Example, Entry 1

A mixture of xylose (15.0 g) and ammonium sulfamate (0.75 g, 6.57 mmol) in water (40.0 g) was stirred at room temperature until a clear solution was obtained (pH 4.3). 28% aq. ammonia (0.055 g; thus efficiently 0.02 g, 0.90 mmol ammonia) was then added dropwise until pH=8.2. The binder solids was then measured (18.4%).

For DMA and mechanical strength studies (15% binder solids solution, 1.0% silane of binder solids), the binder mixture was diluted with water (0.210 g/g binder mixture) and 10% aq. silane (0.018 g/g binder mixture). The final binder mixture had pH=6.8.

Binder Example, Entry 4

A mixture of 75.1% aq. glucose syrup (20.0 g; thus efficiently 15.0 g glucose syrup) and ammonium sulfamate (0.75 g, 6.57 mmol) in water (35.0 g) was stirred at room temperature until a clear solution was obtained (pH 4.2). 28% aq. ammonia (0.069 g; thus efficiently 0.02 g, 1.13 mmol ammonia) was then added dropwise until pH=8.1. The binder solids was then measured (19.0%).

For DMA and mechanical strength studies (15% binder solids solution, 1.0% silane of binder solids), the binder mixture was diluted with water (0.250 g/g binder mixture) and 10% aq. silane (0.019 g/g binder mixture). The final binder mixture had pH=8.3.

Binder Example, Entry 6

A mixture of 75.1% aq. glucose syrup (20.0 g; thus efficiently 15.0 g glucose syrup) and ammonium sulfamate (0.60 g, 5.26 mmol) in water (35.0 g) was stirred at room temperature until a clear solution was obtained (pH 4.2). The binder solids was then measured (19.3%).

For DMA and mechanical strength studies (15% binder solids solution, 0.5% silane of binder solids), the binder mixture was diluted with water (0.275 g/g binder mixture) and 10% aq. silane (0.010 g/g binder mixture). The final binder mixture had pH=7.4.

Binder Example, Entry 7

A mixture of 75.1% aq. glucose syrup (20.0 g; thus efficiently 15.0 g glucose syrup) and N-cyclohexyl sulfamic acid (1.50 g, 8.37 mmol) in water (35.0 g) was stirred at room temperature until a clear solution was obtained (pH 1.2). 28% aq. ammonia (0.65 g; thus efficiently 0.18 g, 10.7 mmol ammonia) was then added dropwise until pH=7.8. The binder solids was then measured (20.9%).

For DMA and mechanical strength studies (15% binder solids solution, 1.0% silane of binder solids), the binder mixture was diluted with water (0.370 g/g binder mixture) and 10% aq. silane (0.021 g/g binder mixture). The final binder mixture had pH=8.3.

Binder Example, Entry 15

A mixture of 75.1% aq. glucose syrup (20.0 g; thus efficiently 15.0 g glucose syrup), ammonium sulfamate (0.75 g, 6.57 mmol) and urea (1.50 g) in water (35.0 g) was stirred at room temperature until a clear solution was obtained (pH 4.4). 28% aq. ammonia (0.035 g; thus efficiently 0.01 g, 0.58 mmol ammonia) was then added dropwise until pH=8.0. The binder solids was then measured (21.1%).

For DMA and mechanical strength studies (15% binder solids solution, 1.0% silane of binder solids), the binder mixture was diluted with water (0.384 g/g binder mixture) and 10% aq. silane (0.021 g/g binder mixture). The final binder mixture had pH=8.5.

Binder Example, Entry 17

A mixture of 75.1% aq. glucose syrup (20.0 g; thus efficiently 15.0 g glucose syrup), urea (1.50 g) and N-cyclohexyl sulfamic acid (0.75 g, 4.18 mmol) in water (35.0 g) was stirred at room temperature until a clear solution was obtained (pH 1.2). 28% aq. ammonia (0.55 g; thus efficiently 0.15 g, 9.0 mmol ammonia) was then added dropwise until pH=8.7. The binder solids was then measured (20.9%).

For DMA and mechanical strength studies (15% binder solids solution, 1.0% silane of binder solids), the binder mixture was diluted with water (0.371 g/g binder mixture) and 10% aq. silane (0.021 g/g binder mixture). The final binder mixture had pH=9.0.

Binder Example, Entry 19

A mixture of 75.1% aq. glucose syrup (18.0 g; thus efficiently 13.5 g glucose syrup), ascorbic acid (1.50 g, 8.52 mmol), 50% hypophosphorous acid (0.60 g; thus efficiently 0.30 g, 4.55 mmol hypophosphorous acid) and ammonium sulfamate (0.75 g, 6.57 mmol) in water (30.5 g) was stirred at room temperature until a clear solution was obtained (pH 1.3). 28% aq. ammonia (1.17 g; thus efficiently 0.33 g, 19.2 mmol ammonia) was then added dropwise until pH=6.4. The binder solids was then measured (21.0%).

For DMA and mechanical strength studies (15% binder solids solution, 0.5% silane of binder solids), the binder mixture was diluted with water (0.389 g/g binder mixture) and 10% aq. silane (0.011 g/g binder mixture). The final binder mixture had pH=7.0.

Binder Example, Entry 20

A mixture of 75.1% aq. glucose syrup (18.0 g; thus efficiently 13.5 g glucose syrup), ascorbic acid (1.50 g, 8.52 mmol) and ammonium sulfamate (0.90 g, 7.89 mmol) in water (30.5 g) was stirred at room temperature until a clear solution was obtained (pH 2.4). 28% aq. ammonia (0.64 g; thus efficiently 0.18 g, 10.5 mmol ammonia) was then added dropwise until pH=6.5. The binder solids was then measured (22.6%).

For DMA and mechanical strength studies (15% binder solids solution, 0.5% silane of binder solids), the binder mixture was diluted with water (0.496 g/g binder mixture) and 10% aq. silane (0.011 g/g binder mixture). The final binder mixture had pH=6.7.

Binder Example, Entry 21

A mixture of 75.1% aq. glucose syrup (18.0 g; thus efficiently 13.5 g glucose syrup), ascorbic acid (1.50 g, 8.52 mmol) and N-cyclohexyl sulfamic acid (0.90 g, 5.02 mmol) in water (30.5 g) was stirred at room temperature until a clear solution was obtained (pH 0.9). 28% aq. ammonia (1.40 g; thus efficiently 0.39 g, 23.0 mmol ammonia) was then added dropwise until pH=7.5. The binder solids was then measured (21.5%).

For DMA and mechanical strength studies (15% binder solids solution, 0.5% silane of binder solids), the binder mixture was diluted with water (0.419 g/g binder mixture) and 10% aq. silane (0.011 g/g binder mixture). The final binder mixture had pH=7.2.

The other binders mentioned in Table 1 were prepared in a manner analogous to the preparation described above.

TABLE 1

| | Reference binders Example | | | | | | |
|---|---|---|---|---|---|---|---|
| | A | B | C | D | E | F | G |
| Binder composition | | | | | | | |
| Ascorb. acid or deriv. (%-wt.) | | | | | | | |
| L-Ascorbic acid | — | — | — | — | 10 | 10 | 20 |
| Carbohydrate (%-wt.) | | | | | | | |
| Glucose syrup | — | — | — | — | 90 | 90 | 80 |
| Xylose | — | — | — | — | — | — | — |
| Pan | — | — | — | — | — | — | — |
| Starch | — | — | — | — | — | — | — |
| Additive (%-wt.)[a] | | | | | | | |
| Urea | — | — | — | — | — | — | — |
| Hypophosphorous acid | — | — | — | — | 5 | 2 | 2 |
| Ammonium sulfate | — | — | — | — | — | — | — |
| Ammonium sulfamate | — | — | — | — | — | — | — |
| N-Cyclohexyl sulfamic acid | — | — | — | — | — | — | — |
| Sodium N-cyclohexyl sulfamate | — | — | — | — | — | — | — |
| Amine (equiv.)[b] | | | | | | | |
| Ammonia (added) | — | — | — | — | 1.2 | 1.2 | 1.5 |
| Silane (% of binder solids) | — | — | — | — | 0.5 | 0.5 | 0.5 |
| Binder properties | | | | | | | |
| Curing onset (° C.) | 144 | 159 | 178 | 196 | 148 | 172 | 158 |
| Curing endset (° C.) | 165 | 172 | 210 | 220 | 169 | 193 | 182 |
| Reaction loss (%) | 39.3 | 28.5 | 28.9 | 30.6 | 33.8 | 33.4 | 35.0 |
| pH of 15% soln. | 5.0 | 10.0 | 6.1 | 6.2 | 6.4 | 6.4 | 6.6 |
| Mechanical strength, unaged | *** | *** | *** | *** | *** | *** | *** |
| Mechanical strength, aged | ** | ** | *** | ** | ** | *** | ** |

TABLE 1-continued

| | Carbohydrate, sulfamic acid and/or derivatives, ammonia Example | | | | | | | | | | | | | | Pan or starch, ammonium sulfamate | |
|---|---|---|---|---|---|---|---|---|---|---|---|---|---|---|---|---|
| | 1 | E | 2 | 3 | 4 | 5 | 6 | F | 7 | 8 | 9 | 10 | 11 | 5 | 12 | 13 |
| Binder composition Ascorb. acid or deriv. (%-wt.) | | | | | | | | | | | | | | | | |
| L-Ascorbic acid | 0 | 10 | 0 | 0 | 0 | 0 | 0 | 10 | 0 | 0 | 0 | 0 | 0 | 0 | 0 | 0 |
| Carbohydrate (%-wt.) | | | | | | | | | | | | | | | | |
| Glucose syrup | — | 90 | 100 | 100 | 100 | 100 | 100 | 90 | 100 | 100 | 100 | 100 | 100 | 100 | — | — |
| Xylose | 100 | — | — | — | — | — | — | — | — | — | — | — | — | — | — | — |
| Pan | — | — | — | — | — | — | — | — | — | — | — | — | — | — | 100 | — |
| Starch | — | — | — | — | — | — | — | — | — | — | — | — | — | — | — | 100 |
| Additive (%-wt.)[a] | | | | | | | | | | | | | | | | |
| Urea | — | — | — | — | — | — | — | — | — | — | — | — | — | — | — | — |
| Hypophosphorous acid | — | 5 | — | — | — | — | — | 2 | — | 2 | — | — | — | — | — | — |
| Ammonium sulfate | — | — | 5 | 2.5 | — | — | — | — | — | — | — | — | — | — | — | — |
| Ammonium sulfamate | 5 | — | — | 2.5 | 5 | 5 | 4 | — | — | — | — | 2 | — | 5 | 5 | 5 |
| N-Cyclohexyl sulfamic acid | — | — | — | — | — | — | — | — | 10 | — | 5 | — | — | — | — | — |
| Sodium N-cyclohexyl sulfamate | — | — | — | — | — | — | — | — | — | — | — | — | 5 | — | — | — |
| Amine (equiv.)[b] | | | | | | | | | | | | | | | | |
| Ammonia (added) | 0.1 | 1.2 | — | — | 0.2 | — | — | 1.2 | 1.3 | 1.7 | 2.7 | — | — | — | — | — |
| Silane (% of binder solids) | 1.0 | 0.5 | 0.5 | 0.5 | 1.0 | 0.5 | 0.5 | 0.5 | 1.0 | 0.5 | 1.0 | 0.5 | 1.0 | 0.5 | 0.5 | 0.5 |
| Binder properties | | | | | | | | | | | | | | | | |
| Curing onset (° C.) | 143 | 148 | 156 | 158 | 165 | 168 | 170 | 172 | 176 | 205 | 205 | 214 | 219 | 168 | 219 | — |
| Curing endset (° C.) | 160 | 169 | 174 | 175 | 182 | 187 | 193 | 193 | 193 | 236 | 253 | 258 | 246 | 187 | 230 | — |
| Reaction loss (%) | 34.8 | 33.8 | 32.3 | 32.4 | 32.6 | 31.7 | 31.3 | 33.4 | 28.5 | 28.0 | 27.2 | 26.1 | 34.2 | 31.7 | 47.3 | 29.3 |
| pH of 15% soln. | 6.8 | 6.4 | 6.2 | 6.1 | 8.3 | 6.5 | 7.4 | 6.4 | 8.3 | 8.4 | 9.5 | 7.7 | 8.6 | 6.5 | 7.6 | 6.6 |
| Mechanical strength, unaged | *** | *** | *** | *** | *** | *** | *** | *** | *** | *** | *** | *** | *** | *** | * | ** |
| Mechanical strength, aged | ** | ** | ** | */** | ** | */** | ** | *** | ** | */** | ** | ** | ** | */** | * | * |

| | Glucose syrup, sulfamic acid and/or derivatives, urea, ammonia Example | | | | | | | Glucose syrup, ascorbic acid, sulfamic acid and/or derivatives, ammonia | | | | | | | |
|---|---|---|---|---|---|---|---|---|---|---|---|---|---|---|---|---|
| | 14 | 4 | 15 | 16 | 17 | 18 | 10 | 19 | E | 20 | F | 21 | 22 | 23 | G | 24 |
| Binder composition Ascorb. acid or deriv. (%-wt.) | | | | | | | | | | | | | | | | |
| L-Ascorbic acid | 0 | 0 | 0 | 0 | 0 | 0 | 0 | 10 | 10 | 10 | 10 | 10 | 10 | 10 | 20 | 20 |
| Carbohydrate (%-wt.) | | | | | | | | | | | | | | | | |
| Glucose syrup | 100 | 100 | 100 | 100 | 100 | 100 | 100 | 90 | 90 | 90 | 90 | 90 | 90 | 90 | 80 | 80 |
| Xylose | — | — | — | — | — | — | — | — | — | — | — | — | — | — | — | — |
| Pan | — | — | — | — | — | — | — | — | — | — | — | — | — | — | — | — |
| Starch | — | — | — | — | — | — | — | — | — | — | — | — | — | — | — | — |
| Additive (%-wt.)[a] | | | | | | | | | | | | | | | | |
| Urea | 5 | — | 10 | 5 | 10 | 5 | — | — | — | — | — | — | — | — | — | — |
| Hypophosphorous acid | — | — | — | — | — | — | — | 2 | 5 | — | 2 | — | — | — | 2 | — |
| Ammonium sulfate | — | — | — | — | — | — | — | — | — | — | — | — | — | — | — | — |
| Ammonium sulfamate | 5 | 5 | 5 | 5 | — | 2 | 2 | 5 | — | 6 | — | — | 2 | — | — | 2 |
| N-Cyclohexyl sulfamic acid | — | — | — | — | 5 | — | — | — | — | — | — | 6 | — | — | — | — |
| Sodium N-cyclohexyl sulfamate | — | — | — | — | — | — | — | — | — | — | — | — | — | 6 | — | — |
| Amine (equiv.)[b] | | | | | | | | | | | | | | | | |
| Ammonia (added) | — | 0.2 | 0.1 | 0.1 | 2.2 | — | — | 1.0 | 1.2 | 0.6 | 1.2 | 1.7 | 1.0 | 1.1 | 1.5 | 1.2 |
| Silane (% of binder solids) | 0.5 | 1.0 | 1.0 | 1.0 | 1.0 | 0.5 | 0.5 | 0.5 | 0.5 | 0.5 | 0.5 | 0.5 | 0.5 | 0.5 | 0.5 | 0.5 |
| Binder properties | | | | | | | | | | | | | | | | |
| Curing onset (° C.) | 162 | 165 | 167 | 170 | 190 | 199 | 214 | 148 | 148 | 162 | 172 | 179 | 189 | 197 | 158 | 168 |
| Curing endset (° C.) | 183 | 182 | 190 | 191 | 212 | 219 | 258 | 163 | 169 | 180 | 193 | 196 | 209 | 217 | 182 | 192 |
| Reaction loss (%) | 32.5 | 32.6 | 30.0 | 29.1 | 30.6 | 27.1 | 26.1 | 32.7 | 33.8 | 27.5 | 33.4 | 31.1 | 27.1 | 34.6 | 35.0 | 33.8 |
| pH of 15% soln. | 7.5 | 8.3 | 8.5 | 8.7 | 9.0 | 7.9 | 7.7 | 7.0 | 6.4 | 6.7 | 6.4 | 7.2 | 6.9 | 7.0 | 6.6 | 8.3 |
| Mechanical strength, unaged | *** | *** | *** | *** | *** | *** | *** | ** | *** | ** | *** | *** | *** | *** | ** | *** |
| Mechanical strength, aged | */** | ** | ** | ** | ** | *** | ** | ** | ** | ** | ** | *** | *** | *** | ** | ** |

[a]Of carbohydrate + ascorbic acid (or derivative).
[b]Molar equivalents relative to additives (excl. urea) + ascorbic acid.

What is claimed is:

1. An aqueous binder composition for mineral fibers, wherein the aqueous binder composition comprises
   a component (i) which comprises one or more carbohydrates having a dextrose equivalent (DE) value of from 60 to less than 100;
   a component (ii) in the form of one or more compounds selected from sulfamic acid, ammonium sulfamate, calcium sulfamate, sodium sulfamate, potassium sulfamate, magnesium sulfamate, cobalt sulfamate, nickel sulfamate, N-cyclohexyl sulfamic acid, and salts of N-cyclohexyl sulfamic acid; and
   one or more compounds selected from
      compounds of the following formula, and any salts thereof:

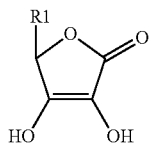

in which R1 corresponds to H, alkyl, monohydroxyalkyl, dihydroxyalkyl, polyhydroxyalkyl, alkylene, alkoxy, or amine;
   compounds of the following formula, and any salts thereof:

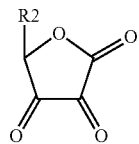

in which R2 corresponds to H, alkyl, monohydroxyalkyl, dihydroxyalkyl, polyhydroxyalkyl, alkylene, alkoxy, or amine,
and wherein the aqueous binder composition is suitable for producing a bonded mineral fiber product by contacting the mineral fibers with the aqueous binder composition and thereafter curing the aqueous binder composition.

2. The aqueous binder composition of claim 1, wherein the component (i) comprises a glucose syrup having a DE of from 60 to less than 100.

3. The aqueous binder composition of claim 1, wherein the component (ii) is present in a concentration of 0.5-15 wt.-%, based on a mass of the component (i).

4. The aqueous binder composition of claim 1, wherein the aqueous binder composition further comprises one or more compounds selected from ammonia and amines.

5. The aqueous binder composition of claim 1, wherein the aqueous binder composition further comprises urea.

6. The aqueous binder composition of claim 1, wherein the aqueous binder composition further comprises one or more fluorescent dyes which become non- fluorescent upon curing of the binder composition.

7. An aqueous binder composition for mineral fibers, wherein the aqueous binder composition comprises
   a component (i) in the form of one or more carbohydrates;
   a component (ii) in the form of one or more compounds selected from sulfamic acid, ammonium sulfamate, calcium sulfamate, sodium sulfamate, potassium sulfamate, magnesium sulfamate, cobalt sulfamate, nickel sulfamate, N-cyclohexyl sulfamic acid, and salts of N-cyclohexyl sulfamic acid;
   one or more compounds selected from ammonia, amines, urea, and fluorescent dyes which become non-fluorescent upon curing of the binder composition; and
   one or more compounds selected from
      compounds of the following formula, and any salts thereof:

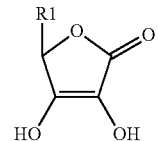

in which R1 corresponds to H, alkyl, monohydroxyalkyl, dihydroxyalkyl, polyhydroxyalkyl, alkylene, alkoxy, or amine;
   compounds of the following formula, and any salts thereof:

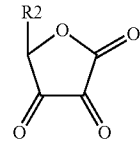

in which R2 corresponds to H, alkyl, monohydroxyalkyl, dihydroxyalkyl, polyhydroxyalkyl, alkylene, alkoxy, or amine,
and wherein the aqueous binder composition is suitable for producing a bonded mineral fiber product by contacting the mineral fibers with the aqueous binder composition and thereafter curing the aqueous binder composition.

8. The aqueous binder composition of claim 7, wherein the aqueous binder composition further comprises one or more compounds selected from ammonia and amines.

9. The aqueous binder composition of claim 7, wherein the aqueous binder composition further comprises urea.

10. The aqueous binder composition of claim 7, wherein the aqueous binder composition further comprises one or more fluorescent dyes which become non-fluorescent upon curing of the binder composition.

11. An aqueous binder composition for mineral fibers, wherein the aqueous binder composition comprises
   a component (i) in the form of one or more carbohydrates;
   a component (ii) in the form of one or more compounds selected from sulfamic acid, cobalt sulfamate, nickel sulfamate, and N-cyclohexyl sulfamic acid,
and wherein the aqueous binder composition is suitable for producing a bonded mineral fiber product by contacting the mineral fibers with the aqueous binder composition and thereafter curing the aqueous binder composition.

12. The aqueous binder composition of claim 11, wherein the component (ii) comprises sulfamic acid.

13. The aqueous binder composition of claim 11, wherein the component (ii) comprises N-cyclohexyl sulfamic acid.

14. The aqueous binder composition of claim 11, wherein the component (ii) comprises one or both of cobalt sulfamate and nickel sulfamate.

15. The aqueous binder composition of claim 11, wherein the component (i) comprises one or more carbohydrates having a dextrose equivalent (DE) value of from 60 to less than 100.

16. The aqueous binder composition of claim 11, wherein the component (i) comprises a glucose syrup having a DE of from 60 to less than 100.

17. The aqueous binder composition of claim 11, wherein the component (ii) is present in a concentration of 0.5-15 wt.-%, based on a mass of the component (i).

18. The aqueous binder composition of claim 11, wherein the aqueous binder composition further comprises one or more compounds selected from ammonia and amines.

19. The aqueous binder composition of claim 11, wherein the aqueous binder composition further comprises urea.

20. The aqueous binder composition of claim 11, wherein the aqueous binder composition further comprises one or more fluorescent dyes which become non- fluorescent upon curing of the binder composition.

* * * * *